United States Patent
Young

(10) Patent No.: US 8,984,296 B1
(45) Date of Patent: Mar. 17, 2015

(54) DEVICE DRIVER SELF AUTHENTICATION METHOD AND SYSTEM

(75) Inventor: David W. Young, Meridian, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 976 days.

(21) Appl. No.: 12/413,579

(22) Filed: Mar. 29, 2009

(51) Int. Cl.
  *G06F 21/51* (2013.01)
  *G06F 21/44* (2013.01)
  *G06F 9/44* (2006.01)
  *G06F 21/57* (2013.01)

(52) U.S. Cl.
  CPC .............. *G06F 21/51* (2013.01); *G06F 9/4411* (2013.01); *G06F 21/57* (2013.01)
  USPC ............................. 713/187; 726/17; 713/176

(58) Field of Classification Search
  CPC ....... G06F 21/54; G06F 9/4411; G06F 21/57; G06F 21/33; G06F 21/51
  USPC ........ 713/187, 176; 717/176–178; 726/26, 17
  See application file for complete search history.

(56) References Cited

U.S. PATENT DOCUMENTS

| | | | |
|---|---|---|---|
| 6,195,794 B1 * | 2/2001 | Buxton | 717/108 |
| 6,615,350 B1 * | 9/2003 | Schell et al. | 713/168 |
| 6,785,818 B1 * | 8/2004 | Sobel et al. | 726/22 |
| 7,073,062 B2 * | 7/2006 | Leung et al. | 713/169 |
| 7,117,371 B1 * | 10/2006 | Parthasarathy et al. | 713/187 |
| 7,480,740 B1 * | 1/2009 | Saxena et al. | 710/8 |
| 7,669,238 B2 * | 2/2010 | Fee et al. | 726/22 |
| 7,704,147 B2 * | 4/2010 | Quraishi et al. | 463/42 |
| 8,060,924 B2 * | 11/2011 | Usov | 726/10 |
| 2002/0112161 A1 * | 8/2002 | Thomas et al. | 713/176 |
| 2002/0174356 A1 * | 11/2002 | Padole et al. | 713/200 |
| 2003/0009677 A1 * | 1/2003 | Strongin et al. | 713/189 |
| 2003/0163719 A1 * | 8/2003 | Ebihara | 713/193 |
| 2004/0073912 A1 * | 4/2004 | Meza | 719/321 |
| 2004/0254013 A1 * | 12/2004 | Quraishi et al. | 463/29 |
| 2005/0005098 A1 * | 1/2005 | Michaelis et al. | 713/156 |
| 2005/0138387 A1 * | 6/2005 | Lam et al. | 713/185 |
| 2005/0246523 A1 * | 11/2005 | Mauro et al. | 713/156 |
| 2006/0015746 A1 * | 1/2006 | Kusudo et al. | 713/187 |
| 2006/0059366 A1 * | 3/2006 | Feinleib et al. | 713/187 |
| 2006/0156007 A1 * | 7/2006 | Stephens-Doll | 713/176 |
| 2006/0209328 A1 * | 9/2006 | Anderson et al. | 358/1.13 |
| 2008/0235803 A1 * | 9/2008 | Harada | 726/26 |
| 2008/0320311 A1 * | 12/2008 | Cho | 713/187 |
| 2009/0154314 A1 * | 6/2009 | Nishida | 369/47.1 |
| 2010/0071030 A1 * | 3/2010 | Rosenan et al. | 726/2 |

OTHER PUBLICATIONS

Michael Spear and Tom Roeder and Orion Hodson and Galen C. Hunt and Steven Levi, "Solving the Starting Problem—Device Drivers as Self-Describing Artifacts", Proceedings of the EuroSys 2006 Conference, p. 45-57 (ACM 2006).*
Schneier, Applied Cryptography, 2ed, pp. 574-576 (1996).*

* cited by examiner

*Primary Examiner* — Jung Kim
*Assistant Examiner* — Theodore Parsons

(57) ABSTRACT

A method for device driver self authentication is provided. The method includes accessing a device driver having encrypted authentication parameters therein including, for instance, a vendor identification, a device identification, a serial number, an expiration date and a filename. The method includes executing an authentication portion of the device driver to generate a message digest of these parameters and comparing the message digest to a stored digest for a match thereof. The method further includes loading the device driver only if the authentication portion successfully authenticates the device driver, e.g., there is a match. The method can be applied to USB device drivers and peripherals.

18 Claims, 5 Drawing Sheets

DEVICE DRIVER SELF AUTHENTICATION METHOD AND SYSTEM

TECHNICAL FIELD

Embodiments of the present invention generally relate to devices and device drivers.

BACKGROUND

Computer systems employ peripheral devices that can add significant functionality for the user. Typically, a peripheral device ("device") is an external electronic device that can be plugged into the computer system using an input/output port, e.g., a Universal Serial Bus (USB) port in one instance. The peripheral device typically has associated therewith a device driver which is a piece of software that the operating system (OS) of the computer system installs and uses to control the functionality of the peripheral device.

For computer systems that utilize the Microsoft operating system, devices and their associated device drivers are "bound" together using a procedure that Microsoft implements called "driver signing." The binding process is used to insure that device drivers have been tested such that they do not interfere with OS functionality. In this binding procedure, a device driver's identification and a vendor's identification are bound to a device's identification. Specifically, driver developers submit to Microsoft an install file (.INF file) which includes various identifications, such as an identification of the device name, its version and an identification of the vendor and the device driver name. This information is then "bound" with the executable driver software (.SYS file) by Microsoft and a signed version of the install file is returned to the driver developer. In this fashion, a particular driver is associated with a particular device type. Once installed on a machine, the device driver will automatically become active (e.g., "loaded") when the associated device is plugged into the computer system. For this reason, these device drivers are often called "plug and play" drivers.

DETAILED DESCRIPTION

Figure 1:
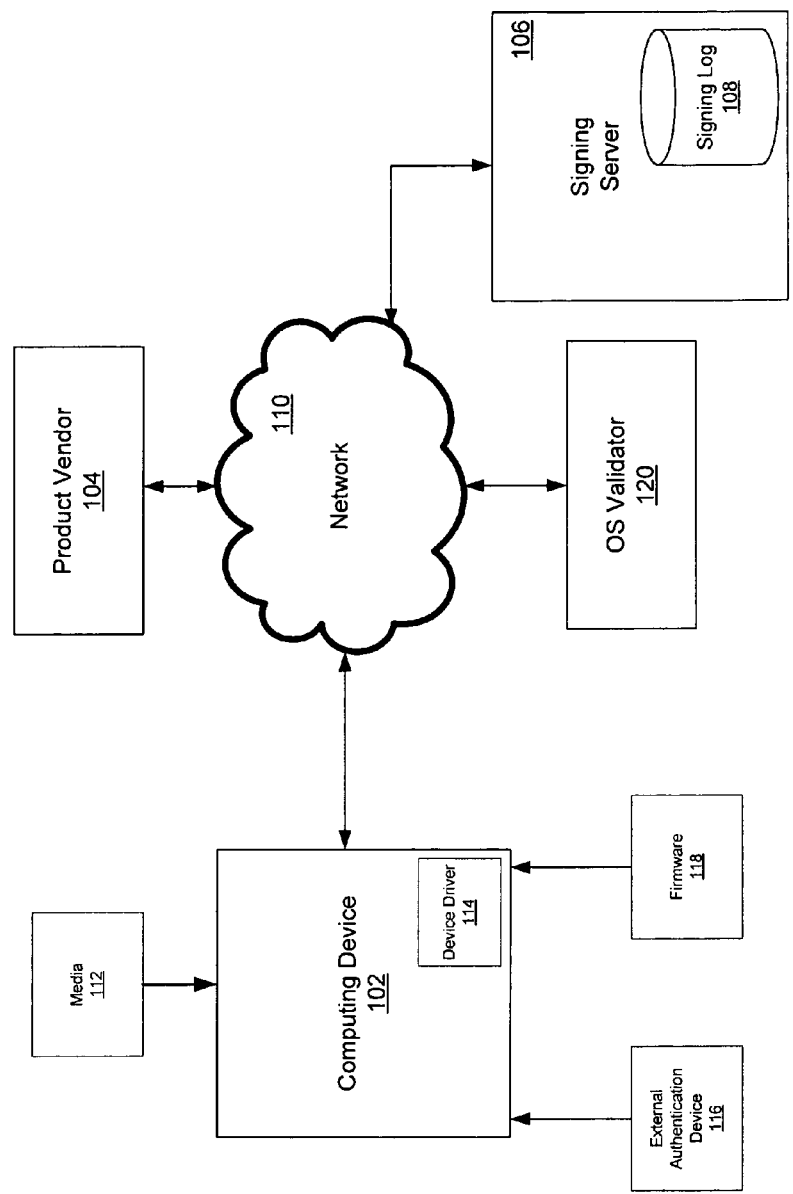
FIG. 1 shows a block diagram of an operating environment, in accordance with an embodiment of the present invention.

Reference will now be made in detail to embodiments of the claimed subject matter, examples of which are illustrated in the accompanying drawings. While the invention will be described in conjunction with embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

The goal of the binding process involving the operating system supplier is to protect the operating system from harmful device driver behavior by requiring the device driver to undergo certain tests before it can be signed and bound. However, the binding process does not validate vendor identifications versus the associated device identifications.

As a result, a third party firmware developer who has access to another company's vendor identification and device identification (e.g., of company A) may submit their own install file and device driver to the operating system supplier for binding with company A's device. It is common for third party firmware developers to obtain the vendor identification and device identification of other companies if they are (or have been) in joint software development with that company. In this case, Company A may have had its own authorized device driver bound to its own device. Now, if the operating system supplier also binds the third party device driver to Company A's device, then registration problems may occur when users of the authorized device driver (originating from company A) attempt to install the authorized device driver on their machine.

Registration problems may occur, because only one device driver can be associated with any device type on any given platform, and two device drivers have been bound to the same device. Either the second driver installation will be prohibited, or, the second driver installation will overwrite the first installation leading to an arbitrary device driver being activated upon device insertion. Either situation is not optimal. For at least this reason, embodiments of the present invention do not allow the loading of an unauthorized device driver that may contain a misappropriated vendor identification and/or product identification that were derived from another company.

Accordingly, a system and method for preventing two or more "plug and play" device drivers (associated with the same device, or with a combination of an approved device and an unapproved device which both use, for example, the Cypress USB Vendor ID) from being installed and active on a same computer system platform are described herein. A driver self-authentication scheme is described in embodiments herein that enforces an authentication policy defined by a driver development source thereby allowing the driver development source to control the conditions/parameters under which the driver is allowed to execute. In this way, third party developers are not allowed to develop drivers that misappropriate the vendor identifications and/or product identifications that are associated with the driver development source.

More specifically, in one embodiment, a developer requests a driver from a driver development source and provides to the driver development source a unique vendor identification of the developer. The driver development source and the developer are typically different organizations. The driver development source then provides a device driver to the developer which includes: 1) an authentication policy; 2) a public key; and 3) a signature (in the driver's .INF file). The signature may include an encrypted hash value (or other message digest) that is generated based on the authentication policy being applied. The hash value is encrypted by the signing authority with the use of a private key (known only by the driver development source, for instance). The digest may include a number of parameters which may include: the driver's code image, the driver's path name, the driver's filename, an expiration date, the vendor identification, the product identification and the device serial number. A self-authenticating driver not signed in this fashion by the driver development source will not operate at all on the developer's computer system.

The developer then uses the self-authenticating driver to develop their product and submits the driver along with any other product software to an OS driver validator, e.g., Microsoft. The OS driver validator then returns a signed driver to the developer (with the signed .INF file within) thereby binding the driver to the product as identified by the product identifier and also validates the driver for use with the operating system. At this point, the driver is both signed by the driver development source and the OS driver validator.

The developer then distributes the signed driver to a customer who installs the driver onto a computer system. The driver contains self-authentication code. Access of the driver is limited to proper authentication according to the stored authentication policy and information within the driver. Therefore, the driver is operable only with the product as identified by the authentication policy. For instance, at start-up (or when a device is coupled to the computer system), the device driver computes a secure hash of its own image based on the above listed secure parameters and compares this computed hash file to a predetermined and stored hash file of the registry. If there is a match (or at least non-conflicting information), then the driver and device are validated and if not, the driver is prevented from operating. Therefore, the device driver implements a usage policy to guarantee that it is used only with the proper vender identification, product identification, serial number, expiration date and filename, for instance.

This method effectively prevents the developer from re-using the product identification information and vendor identification information associated with the driver development party. This is the case because the driver will not function on the customer's computer system without successful authentication based on the developer's supplied identifiers.

Embodiments also include a computer system comprising a processor and a memory, the processor for executing a method of authenticating a device driver, the memory comprising: accessing predetermined authentication information associated with the device driver, wherein the predetermined authentication information comprises an authentication policy; decrypting an encrypted portion of the authentication information to obtain a first message digest value; calculating a second message digest value based on the authentication policy; comparing the first and second message digest values; and loading the device driver and allowing the device driver to interface with an associated device in response to a match of the first and second message digest values, and otherwise terminating execution of the device driver. Embodiments may further provide authentication of firmware and authenticate device drivers based on external devices (e.g., a dongle).

It is noted that while embodiments of the present invention may be described herein with regard to Universal Serial Bus (USB) device drivers as examples, embodiments of the present invention may operate with any type of peripheral communications bus (e.g. SPI, I2C, SMBUS, RS-232, PS/2, PCI, etc), peripheral device, device driver or driver software, such as those of printers, video adapters, network cards, sound cards, computer storage devices and other peripherals. The USB standard is merely an example.

FIG. 1 shows block diagram of an exemplary operating environment, in accordance with one embodiment of the present invention. Operating environment 100 includes computing device 102, product vendor 104, signing server 106, OS validator 120, and network 110. Network 110 may be implemented using a variety of communication networks including, but not limited to, a local area network (LAN), wireless network, or the internet.

In this embodiment, the product vendor 104 (e.g., a third party developer) requests a signed driver from signing server 106 for use with a product. For example, product vendor 104 may be a company or software developer developing a product requiring a driver (e.g., a USB driver). The signing server 106 is controlled by a driver development source. In one embodiment, product vendor 104 may provide a vendor identifier (VID) and product identifier (PID) along with the request for the signed driver. Signing server 106 stores various attributes of the request for a signed device driver (e.g., VID/PID, driver version, identity of product vendor 104). The signed device driver will include a message digest value computed according to an authentication policy applied using a private key and a number of parameters, including the driver's code image, the vendor identification, the product identification, an expiration date, a serial number and/or a filename. A signed driver is then returned to the product vendor 104.

The signing of the driver by signing server 106 effectively restricts the use of the driver prior to sending it to the OS Validator 120 for OS validation. It is appreciated that product vendor 104 must follow correct procedures (e.g., applies for a vendor ID), in order to obtain a signed driver. An unsigned driver will not operate on the product vendor's computer system. In one embodiment, a public key may be stored in the .INF file of the driver that is returned to the product vendor 104.

After receiving the signed driver from signing server 106, product vendor may send the signed driver to operating system (OS) validator 120. OS validator 120 validates the driver for use with a particular operating system and further signs the driver. In one embodiment, OS validator 120 is an operating system manufacturer (e.g., Microsoft Corporation of Redmond, Wash.). OS validator 120 may then send the validated and signed driver back to product vendor 104 (e.g., via network 110).

For example, Microsoft may use a program called device test manager (DTM) to test the driver provided by product vendor 104. Upon successful testing, Microsoft may then sign the manifest based on the VID/PID combination with that driver. The manifest is then distributed with the driver and allows the driver to be installed on certain operating systems. The signing of the manifest ensures that the driver is compatible with the OS. OS validation may bind information into an install file which identifies a variety of attributes including, but not limited to, device driver name and version, what devices (e.g., USB devices) the device driver works with, what device driver's name is in the device manager, where the device driver is loaded, what things need to be installed into the registry to support the installation file. The installation file (e.g., ".inf" file) and the device driver file (e.g., '.sys" file) may thus be bound together cryptographically during OS validation.

OS validation may only test for driver functionality and not test for unintended behavior. In particular, the OS validation process does not test for multiple drivers being bound to a same identified product or vendor identification. Advantageously, embodiments of the present invention provide for self authentication of the driver according to the above identified secure parameters, one of which being the product identification.

According to the example of FIG. 1, the validated and signed driver 114 is then provided to computing device 102, e.g., a customer system. Computing device 102 may be a variety of devices including, but not limited to, hand held devices, computers, laptops, notebooks, netbooks, video game consoles, cellular telephones, smart phones, touch pads, televisions, set top boxes, and driver development kits. In one embodiment, product vendor 104 may provide the validated and signed driver 114 to computing device 102 via media 112. Media 112 may be any of a variety of computer readable media including, but not limited to, CD-ROMs, DVDs, Blu-ray disc, floppy disks, flash memory, and hard disk drives. Computing device 102 may receive device driver 114 from product vendor 104 via network 110.

Computing device 102 executes device driver 114 which self-authenticates using information added during the signing by signing server 106, as described further herein. In summary, device driver 114 executes the authentication policy to generate a message digest value based on the above secure parameters and compares this computed digest value against a stored digest value of the registry. Authentication is based on a match thereof. Device driver 114 loads upon valid self-authentication and thus enforces the policies set by signing server 106, e.g., use with the proper product identification, etc. It is appreciated that device driver 114 may thus prevent misuse of sample drivers (e.g., use of others' VID/PID) and other information based on the policies set by signing server 106. Importantly, the use of the signing server 106 and the self-authentication described herein prevents the use of unauthorized drivers that contain vendor and product identifications from the driver development source.

In another embodiment, device driver 114 authenticates based on additional polices in external authentication device 116 (e.g., external security device or dongle). In another embodiment, device driver 114 may further utilize firmware 118 for authentication to authenticate firmware 118.

Figure 2:
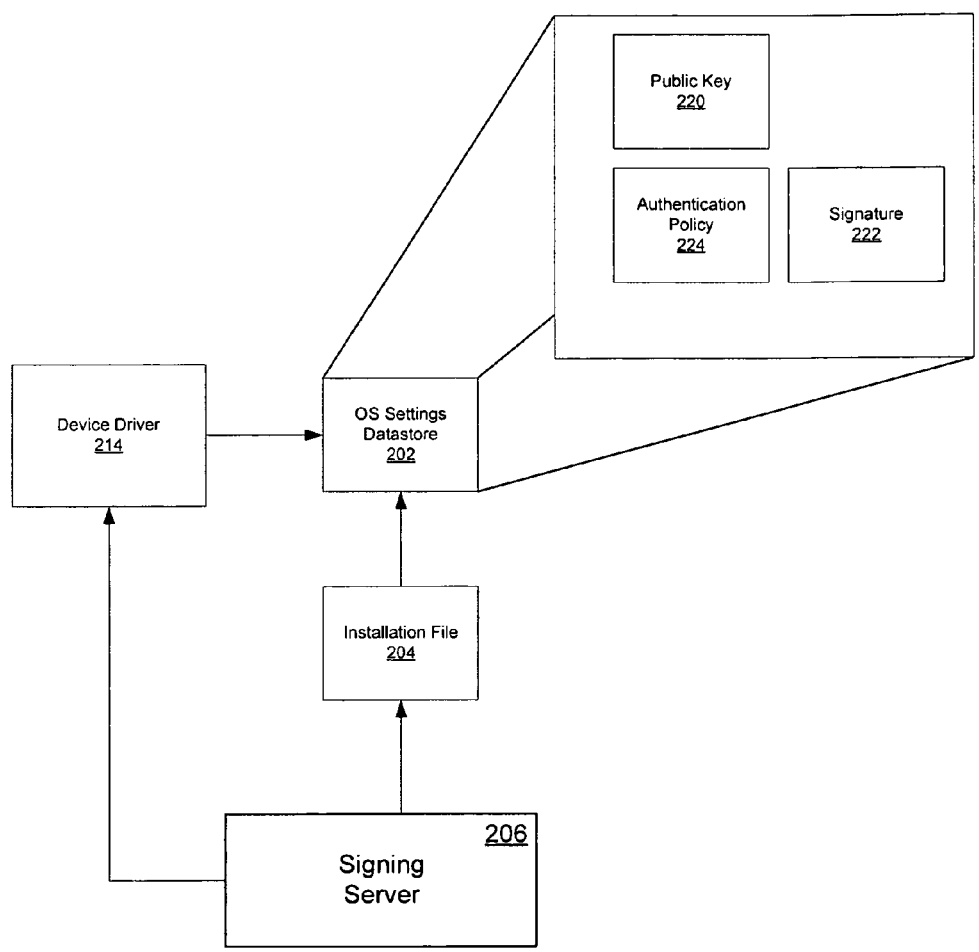
FIG. 2 shows a block diagram of an device driver authentication information dataflow, in accordance with an embodiment of the present invention.

FIG. 2 illustrates further details of the self-authentication system utilized in accordance of embodiments of the present invention and more specifically shows a block diagram of an exemplary device driver authentication information dataflow. Device driver authentication information dataflow 200 includes device driver 214, operating system (OS) settings datastore 202, installation file 204, and signing server 206 (controlled by the driver development source).

Signing server 206 obtains a device driver from its library and signs the device driver 214 in such a way that device driver 214 can self-authenticate. In one embodiment, the device driver and associated information used for authentication are provided by the signing server 206.

In one embodiment, signing server 206 takes the latest version of the driver and creates a signed copy of that driver, device driver 214 (e.g., for product vendor 104). The public key, signature, and authentication policy are pre-generated by a "signing program" (on server 206) and then included in the installation file 204 (e.g., an ".inf" file) of the driver.

During the signing process of device driver 214, various parameters are used by the signing server 206 to tie the signature to that device driver (e.g., a specific version of the device driver). The various parameters can include, but are not limited to, device driver file path, device driver file name, vendor identifier (VID), product identifier (PID), and expiry date. Each of the parameters can be included in the scope of a hash function or other message digest (e.g., secure hash algorithm (SHA)). The hash value may then be signed with a private key (e.g., an RSA private key or a private elliptic curve key). The private key is not known outside the driver development source which operates the signing server 206. It one embodiment, the driver development source may be a kit development company). A signing log is kept in a private datastore (e.g., database or singing log 108) as a record of all the signings. The private key is not distributed from the signing authority (e.g., on signing server 206). The signature may then be distributed in an installation file 204 (e.g., ".inf") along with the public key for device driver 214.

The signed device driver 214 can then be used for testing (e.g., by a product vendor 104 of FIG. 1). An operating system (OS) validator may then also sign device driver 214 (e.g., signs the manifest of installation file 204). The signing of device driver 214 by signing server 206 ensures that device driver 214 can only be tested by a third party developer that has successfully provided its own vendor identification. Also, the signed driver 214 is only operable with the identified device (e.g., product).

In one embodiment, signing server 206 works with completed device driver files (e.g., ".sys" files) and generates a hash value and a fresh public and private key pair for each device driver request. The hash value along with the public key may be stored in installation file 204 (e.g., ".inf" file). It is appreciated that working with complete device driver files reduces the workload on signing server 206 as the signing server 206 avoids inserting a public key into the driver and rebuilding the driver with each request. It is appreciated that the public key (and hash value) may start out in installation file 204 and be transferred into a registry when installation file 204 is installed, which is a secure process that is performed by the OS.

In another embodiment, signing server 206 stores the public key in the driver itself. Signing server 206 may thus generate a public and private key pair and build the public key into the device driver file. It is appreciated that a public and private key pair may be reused so that the driver does not need to be rebuilt each time a new key pair is generated by signing server 206. For example, a number of preconfigured drivers may be queued up, each with different public keys and selected (e.g., randomly, cyclically) by signing server 206.

The device driver 214 is capable of self-authentication. Device driver 214 accesses operating system (OS) datastore 202 during the authentication process. In one embodiment, OS settings datastore 202 includes public key 220, authentication policy 224, and signature 222. Device driver 214 self-authenticates based on public key 220, signature 222, and authentication policy 224 which may be stored in the datastore managed by the operating system (e.g., registry) or other source (e.g., external dongle). In one embodiment, device driver 214 uses public key 220 to decrypt signature 222 to obtain a first hash value.

Device driver 214 then computes a hash based on performing the functionality specified within the authentication policy 224. In one embodiment, device driver 214 computes a SHA (Secure Hash Algorithm) value based on authentication policy 224. The hash may be computed based on a variety of parameters including, but not limited to, the device driver file (e.g., ".sys" file), the device driver's fully qualified path name, expiry date (if not passed), vendor identifier (VID), product identifier (PID), and device serial number. Each of the parameters may be selectively specified in authentication policy 224. The VID, PID, and device serial number may be obtained from device descriptors (e.g., USB device descriptors). The expiry date may be compared against the current date obtained from the operating system.

The resulting computed hash value is compared against the first hash value, e.g., the decrypted signature, and if the hash value and decrypted signature match, the device driver is permitted to load (e.g., it is authenticated). In this fashion, the signing server only provides copies of drivers that will execute with preconfigured vendor and product identifications. Therefore, no driver (having the vendor identification and/or product identification of the driver development source) is allowed to execute on a computer system platform unless that driver is authentic, e.g., it originated from the driver development source and it has not been modified.

In comparing the hash value and the decrypted signature, for instance, the comparison does not have to match exactly, in some embodiments, and may just not be in conflict with each other. For instance, in comparing the expiry date and the current date, the dates do not have to match. In one embodiment, the computed secure hash value is compared with hash in the decrypted signature per public key cryptography standards (PKCS) #1 or other national institute of standards and technology (NIST) approved scheme. Device driver 214 thus implements the usage policies of authentication policy 224 to guarantee that device driver 214 is used with the proper VID/PID, serial number, expiration date, driver file name (e.g., ".sys" filename), and path.

In one embodiment, authentication policy 224 may be accessed from an external device (e.g., USB dongle). It is appreciated that authentication policy 224 may comprise an authentication policy stored on the same media as device driver 214 and additional authentication policies may be stored on the external device.

In another embodiment, device driver 214 accesses a firmware file having its own policy with expiry data, VID, PID, and a signature based on a public and private key pair from a product vendor (e.g., product vendor 104). Device driver 214 may thus allow product vendors to provide authenticated firmware for their devices. It is appreciated that the use of RSA/SHA with approved "PKCS #1" signature padding techniques qualifies firmware authentication and download for use in government applications. For example, a malicious touchpad firmware download is intended to perform a buffer-overrun attack on the host PC system, but the malicious firmware is not properly signed and will not be downloaded by the self-authenticated driver during system boot.

Example Systems

Figure 3:
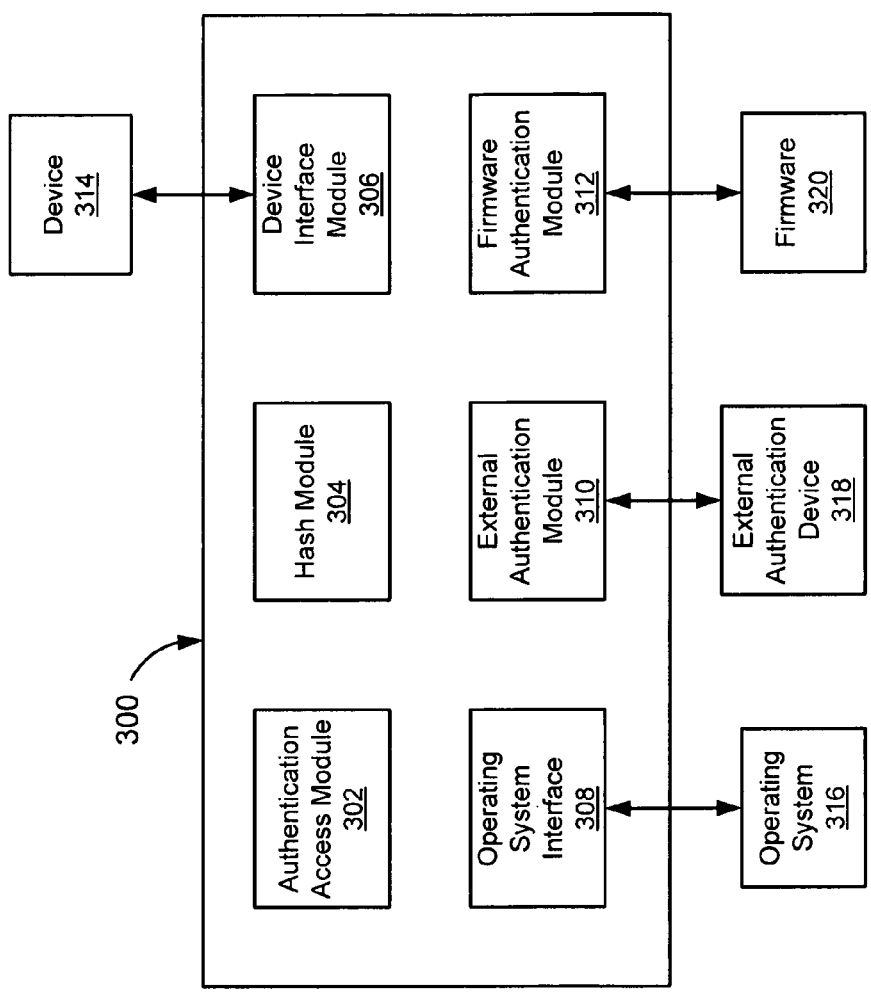
FIG. 3 shows a block diagram of a system for device driver execution, in accordance with another embodiment of the present invention.

FIG. 3 illustrates example components used by various embodiments of the present invention. Although specific components are disclosed in system 300 it should be appreciated that such components are exemplary. That is, embodiments of the present invention are well suited to having various other components or variations of the components recited in system 300. It is appreciated that the components in system 300 may operate with other components than those presented, and that not all of the components of system 300 may be used to achieve the goals of system 300.

Further, system 300 includes components or modules that, in various embodiments, are carried out by software, e.g., a processor under the control of computer-readable and computer-executable instructions. The computer-readable and computer-executable instructions reside, for example, in data storage features such as computer usable memory, removable storage, and/or non-removable storage. The computer-readable and computer-executable instructions are used to control or operate in conjunction with, for example, a processing unit.

It should be appreciated that the aforementioned components of system 300 can be implemented in hardware or software or in a combination of both.

FIG. 3 shows block diagram of an exemplary electronic system for device driver execution, in accordance with another embodiment of the present invention. System 300 includes authentication access module 302, hash module 304, device interface module 306, operating system interface 308, external authentication module 310, and firmware authentication module 312.

Authentication access module 302 accesses pre-generated authentication information to be used for authenticating the device driver. The authentication information is generated by a device driver signing server (e.g., signing server 206). As described herein, the signing server may generate a hash value based on a public key and private key pair based on a variety of secure parameters (e.g., vendor identifier (VID), product identifier (PID), etc.). In one embodiment, the signing server builds the public key into the device driver. In another embodiment, the signing server puts the public key in an installation file associated with the device driver.

Hash module 304 determines a message digest value, e.g., a hash value to compare against a portion of the pre-generated authentication information. In one embodiment, the hash value is based on a variety of parameters including, but not limited to, a device driver file image, a device driver filename, VID, PID, expiration date, and device serial number. The parameters used in the hash value are based on the authentication policy specified during the signing of the device driver. The computed hash value is compared against a portion of the authentication information (e.g., a decrypted signature) accessed by authentication access module 302.

Operating system (OS) interface module 308 accesses information from an operating system. The OS interface module 308 may facilitate access to information in the registry, installation file, time and/or date information from the operating system used to compute the hash value by hash module 304. In embodiments where the stored authentication value is located within the registry, the OS interface module 308 is used to obtain this information.

Device interface module 306 accesses information from an associated peripheral device. Device interface module 306 provides access to information obtained from the device. The information is provided to hash module 304 in order to perform device driver authentication. As described herein, a device may have information including, but not limited to, VID, PID, device descriptors, and device serial numbers.

Firmware authentication module 312 authenticates firmware. The firmware file may be used as a parameter in the hash value computed by hash module 304. The inclusion of the firmware in the hash value extends the authenticated driver environment to include the driver and the attached device. For example, including the firmware in the hash prevents unauthorized or unapproved firmware from being loaded onto an onboard device (e.g., touchpad, keypad) which is treated as trusted making compromising the onboard device particularly harmful.

External authentication information access module 318 of FIG. 3 accesses authentication information on an external device (e.g., dongle, USB dongle). Hash module 304 may look to the external device and loads the policies that are on the external device via external authentication information access module 318. Authentication may then be performed using the policies located on the external device. The authentication policies on the external device may be used in addition to the authentication policies accessed by the device driver and device driver authentication thus becomes multiple factor authentication. It is appreciated that authentication policies may be stored on multiple external devices.

It is appreciated that the external device may be the device to which the device driver corresponds (e.g., a mouse with authentication policies and the device driver for the mouse) or a completely separate device from the device to which the driver corresponds. The external device may thus be distributed with the device. For example, the driver may not work with a particular piece of hardware if the external device is not present. As another example, the driver may not work at all depending on the policy on the external device. Exemplary external devices include, but are not limited to, a SecureID, secure card devices, and secure key fob.

Example Operations

Figure 4:
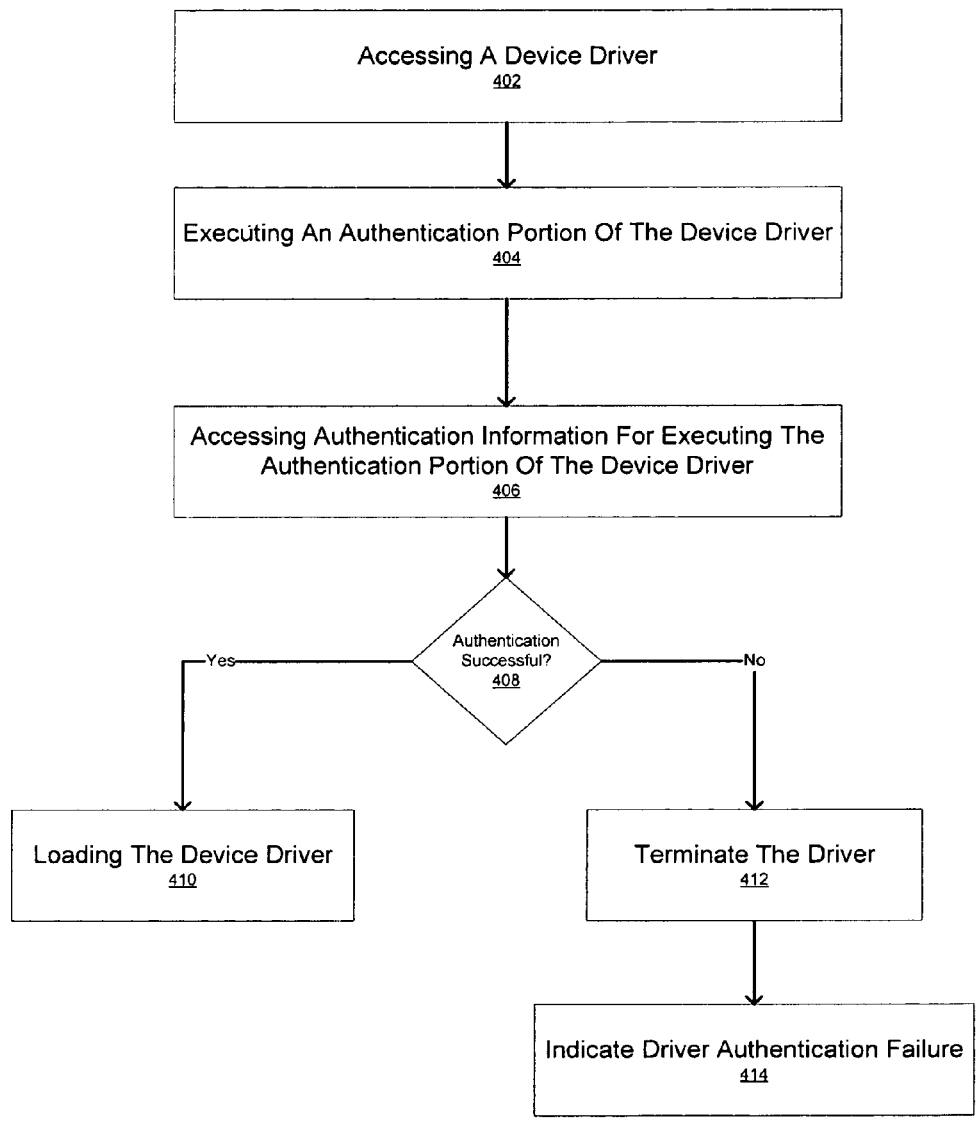
FIG. 4 shows a flowchart of a method for executing a device driver, in accordance with an embodiment of the present invention.
Figure 5:
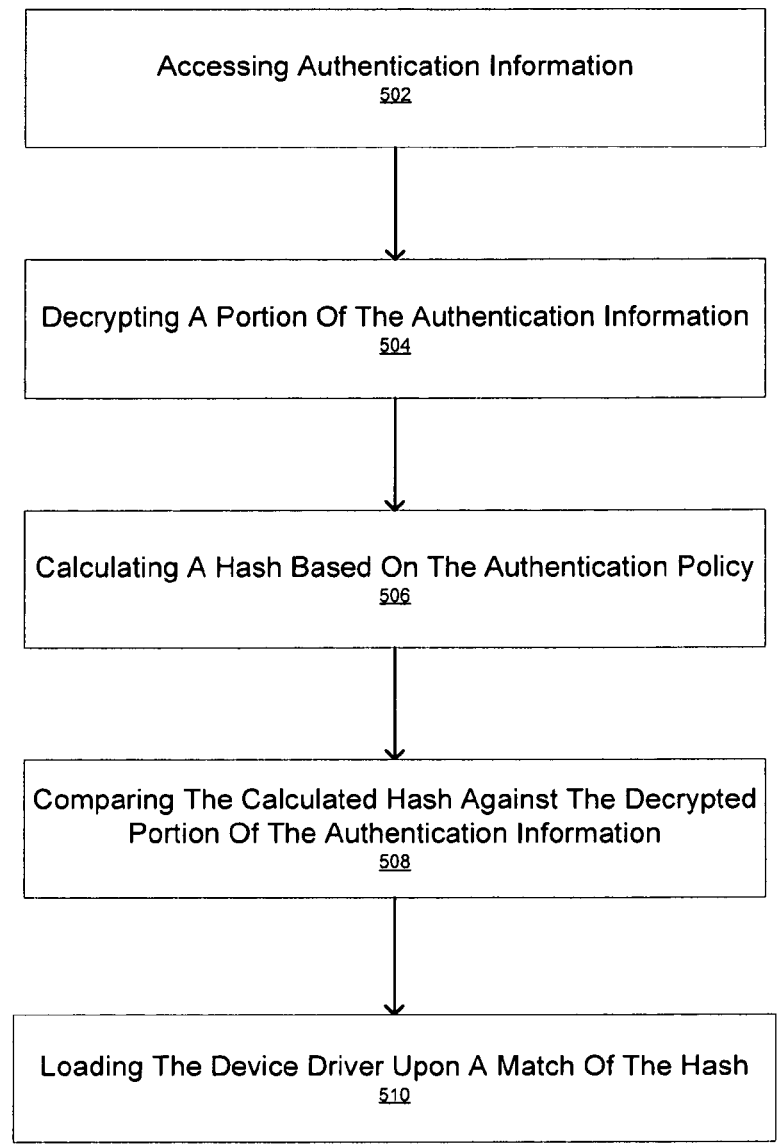
FIG. 5 shows a flowchart of a method for authenticating a device driver, in accordance with an embodiment of the present invention.

With reference to FIGS. 4 and 5, exemplary flowcharts 400 and 500 illustrate example functions used by various embodiments of the present invention. Although specific blocks are disclosed in flowcharts 400 and 500, such blocks are exemplary. That is, embodiments are well suited to performing various other blocks or variations of the blocks recited in flowcharts 400 and 500. It is appreciated that the blocks in flowcharts 400 and 500 may be performed in an order different than presented, and that not all of the blocks in flowcharts 400 and 500 may be performed. Flowcharts 400 and 500 include processes that, in various embodiments, are carried out by a processor under the control of computer-readable and computer-executable instructions. Embodiments of the present invention may thus be stored as computer readable media or computer-executable instructions.

In particular, FIG. 4 shows a flowchart of an exemplary method for executing a device driver that performs self-authentication, in accordance with an embodiment of the present invention. The blocks of flowchart 400 may be carried out by a device driver during self-authentication or by a system performing device driver execution control (e.g., system 300).

At block 402, a device driver is accessed at a computer system platform. The device driver may be accessed during a variety of events including, but not limited to, start-up, bootup, device discovery (e.g., when a device is coupled to a computing device and a plug and play interrupt is issued), etc.

At block 404, an authentication portion of the device driver is executed. As described herein, the authentication portion of the device driver can include generating a hash value based on a plurality of parameters. In one embodiment, the authentication portion of the device driver comprises verifying a unique filename of the device driver. The verification of a unique file name allows embodiments of the present invention to avoid the device drivers being overwritten or other version conflicts. For example, driver filenames may be unique for each version of the driver.

The authentication portion of the driver may further enforce that the vendor and/or product identification be unique. For instance, the driver is operable only with an identified product. The authentication portion of the driver may further enforce that the installation path be unique. For example, each device driver version may be located in a separate subfolder. The use of unique filenames and subfolders prevent the overwriting of drivers and therefore the use of the wrong version of the driver. Thus, embodiments of the present invention allow running different of versions of a driver separately, each device driver having its own separate channels for I/O packets.

The authentication portion of the device driver may further verify a driver class globally unique identifier (GUID). It is appreciated that authentication of the device driver prevents another device driver from maliciously using a device driver's Class GUID. That is, the verification of the device driver class GUID during device driver authentication ensures that the GUID corresponds to an interface for communication with a device driver (e.g., that the device driver will respond to a certain set of commands, buffer layout, and how to interact with it). In one embodiment, the driver class GUID is in an installation file and referenced by other applications or software to determine whether or not a driver with the corresponding driver class GUID is loaded.

At block 406, stored authentication information for executing the authentication portion of the device driver is accessed. As described herein, the authentication information may comprise a public key, a signature, an authentication policy, and various parameters based on the authentication policy. A hash value is determined by decrypting the signature with the public key.

At block 408, a determination is made as to whether authentication is successful. As described herein, the authentication may be based on comparing a computed hash value of various driver parameters with a stored signature in the driver authentication information. If authentication is successful, block 410 is performed. If authentication is unsuccessful, block 412 is performed.

At block 410, the device driver is loaded and allowed to interface with the associated device. The device driver is loaded based on the successful authentication of the driver.

At block 412, the device driver is terminated. The termination of the device driver prevents the misuse of a driver without the correct properties or parameters (e.g., device driver file image, device driver filename, path, VID, PID, device serial number).

At block 414, driver authentication failure is indicated. In one embodiment, an on screen message may be presented indicating that driver authentication has failed and the reasons for the failure (e.g., incorrect PID, VID, expiration, incorrect device serial number, incorrect device driver file image, incorrect device driver filename, and incorrect device driver path).

FIG. 5 shows a flowchart of an exemplary method for self-authentication of a device driver, in accordance with an embodiment of the present invention. The blocks of flowchart 500 may be carried out by a device driver during self-authentication or by a system performing device driver execution control (e.g., system 300).

At block 502, stored and predetermined authentication information pertinent to a specific driver is accessed. As described herein, the authentication information may comprise an authentication policy, a public key, and a signature. The public key may be stored in the device driver (e.g., embedded), an installation file (e.g., a "inf" file), or operating system datastore (e.g., registry). As described herein, the authentication information may also be stored on a removable device (e.g., USB dongle).

At block 504, a portion of the authentication information is decrypted. As described herein, a signature is decrypted to be compared against a hash value based on the authentication policy.

At block 506, a new hash value is calculated based on the authentication policy. As described herein, the hash value may be calculated on a variety of parameters including, but not limited to, an image of the device driver file, a vendor identifier (VID), a product identifier (PID), an expiry date, and a device serial number.

At block 508, the calculated hash value is compared against the decrypted portion of the stored and predetermined authentication information. At block 510, the device driver is loaded upon a match of the hash values indicating there is a successful authorization.

Thus, embodiments of the present invention employ cryptographic techniques to enforce use-based policies that control driver versioning, licensing, and prevent misuse of device drivers. The policies allow control of the device driver for use with properly vetted product information (e.g., vendor ID, product ID, expiry date, device serial numbers). Embodiments of the present invention further provide for allowing multiple versions of the driver to co-exist on a single operating platform, each version potentially servicing a unique device (e.g., different device development kits). This prevents driver versions from overwriting each other or other version conflicts. Embodiments of the present invention also provide for firmware authentication and authentication based on external devices (e.g., dongles).

What is claimed is:

1. A computer system comprising a processor and a memory, said processor for executing a method of authenticating a device driver, said method comprising:
    accessing, from the device driver and responsive to a peripheral device being coupled to the computer system, predetermined authentication information stored in the device driver, wherein the predetermined authentication information comprises an authentication policy defined by a driver developer source and a signature provided by the driver developer source, said device driver validated and signed by each of the driver developer source and an operating system validator;
    decrypting the signature to obtain a first message digest value, the first message digest value generated by the driver developer source using a first vendor identifier and a first product identifier provided by a vendor and a first device driver parameter provided by the driver developer source, the first device driver parameter including at least one of a first driver code image, a first driver path name, and a first driver filename;
    generating, by the device driver, a second message digest value according to said authentication policy using a second vendor identifier, a second product identifier received from the peripheral device coupled to the computer system, and a second device driver parameter including at least one of a second driver code image, a second driver path name, and a second driver filename;
    comparing said first and second message digest values; and
    loading said device driver in response to a match of said first and second message digest values, and otherwise terminating execution of said device driver, wherein the match ensures that the first vendor identifier and first product identifier provided by the vendor and the first device driver parameter provided by the driver developer source are the same as the second vendor identifier, the second product identifier, and the second device driver parameter received from the peripheral device.

2. The computer system of claim 1, wherein said first and second message digest values are hash values.

3. The computer system of claim 2, wherein said predetermined authentication information further comprises a public key.

4. The computer system of claim 3, wherein said public key is stored in a datastore of an operating system.

5. The computer system of claim 3, wherein said public key is stored in said device driver.

6. The computer system of claim 3, wherein said public key is stored in an installation file associated with said device driver.

7. The computer system of claim 1, further comprising accessing further predetermined authentication information stored on a removable device.

8. The computer system of claim 1, wherein the generating of said second message digest value includes generating said second message digest value using an image of said device driver file.

9. The computer system of claim 1, wherein the generating of said second message digest value includes generating said second message digest value using at least one of an expiration date of said device driver and a device serial number.

10. The computer system of claim 1, wherein said device driver is a plug and play Universal Serial Bus (USB) device driver.

11. An electronic system comprising:
    a port configured to connect with a device;
    an authentication access module configured to access predetermined authentication information generated by a signing server, the access being responsive to the device being connected to the authentication access module, the predetermined authentication information including a signature and an executable authentication policy provided by the signing server, wherein the signing server is configured to generate said signature using a first vendor identifier and a first product identifier provided by a device vendor and a first device driver parameter provided by a driver developer source, the signature and the executable authentication policy stored within a device driver, and the first device driver parameter including at least one of a first driver code image, a first driver path name, and a first driver filename;
    a hash module configured to execute said authentication policy to determine a hash value to compare against said signature, wherein said hash value is calculated according to the authentication policy using a second vendor identifier, a second product identifier, and a second device driver parameter received from the device, wherein the second device driver parameter includes at least one of a second driver code image, a second driver path name, and a second driver filename, wherein a match between said hash value and said signature ensures that the first vendor identifier and the first product identifier provided by the vendor and the first device driver parameter are the same as the second vendor identifier, the second product identifier, and the second device driver parameter received from the device;
    an operating system interface module configured to access information from the operating system, the operating system having previously signed the device driver; and
    a device interface module configured to access information including the second vendor identifier and the second product identifier from said device, wherein said hash module utilizes said information accessed via said operating system interface module and said information accessed from said device for determining said hash value.

12. The system of claim 1, further comprising:
    a firmware authentication module configured to authenticate firmware from the operating system.

13. The system of claim 1, wherein said device driver is a plug and play device driver and wherein said port is a Universal Serial Bus (USB) port.

14. The system of claim 1, wherein said signing server is configured to generate said signature based on a public key and private key pair.

15. The system of claim 1, wherein said signing server is operable to associate said predetermined authentication information with said device driver.

16. A non-transitory computer readable media comprising instructions that when executed by a processor of a computer system implement a method of executing a device driver, said method comprising:

responsive to a device being coupled to the computer system, executing an authentication policy stored within said device driver with a signature, the executing of the authentication policy including computing a first message digest using a first device identifier, a first product identifier, and a first device driver parameter provided by the device associated with the device driver, the first device driver parameter including at least one of a first driver code image, a first driver path name, and a first driver filename, said authentication policy and signature provided to said device driver by a signing server, said device driver, after being signed by said signing server, validated and signed by an operating system;

authenticating said device driver by comparing the first message digest with a second message digest, said second message digest calculated using a second device identifier and a second product identifier provided by a vendor of the device and a second device driver parameter provided by a driver developer source, the second device driver parameter including at least one of a second driver code image, a second driver path name, and a second driver filename; and loading said device driver if said authenticating successfully authenticates said device driver, otherwise preventing said device driver from loading, wherein said loading comprises allowing said device driver to communicate with the device associated therewith.

17. The non-transitory computer readable media of claim 16, wherein said authentication policy comprises computing the first message digest of: an image of said device driver; a vendor identifier; the device identifier; and an expiration date of said device driver.

18. The non-transitory computer readable media of claim 16, wherein said device driver is a plug and play device driver and wherein said second message digest is within a predetermined encrypted signature.

* * * * *